United States Patent [19]

Benson et al.

[11] 4,252,484
[45] Feb. 24, 1981

[54] UNSTACKING MACHINE

[75] Inventors: Ronald B. Benson, Stillwater; William J. Courteau, St. Paul; Keith W. Nord, Stillwater; William H. Williams, Maplewood, all of Minn.

[73] Assignee: Ex-Cell-O Corporation, Troy, Mich.

[21] Appl. No.: 53,460

[22] Filed: Jun. 29, 1979

[51] Int. Cl.³ .............................................. B65G 59/06
[52] U.S. Cl. ..................................... 414/127; 414/786
[58] Field of Search ............... 414/127, 126, 125, 113, 414/54, 786

[56] References Cited

U.S. PATENT DOCUMENTS 3,869,048   3/1975   Takahashi ........................... 414/127

Primary Examiner—Jeffrey V. Nase
Attorney, Agent, or Firm—John P. Moran

[57] ABSTRACT

The disclosure illustrates and describes a machine (10) for handling and unstacking dollies (14) loaded with stacks (16) of cross-nested baskets (18) wherein the front and rear walls of the individual baskets are positioned at random. The machine includes an inlet section (12) and an orienting section (20). In the former, lift and pusher elements (36, 42, 44, 46, 51) are provided for separating a stack from its dolly, and in the latter, lift and turn elements (52, 62, 64, 66, 100, 106, 108) are provided for orienting each bottom basket in turn, separating it from the stack, and discharging it.

4 Claims, 11 Drawing Figures

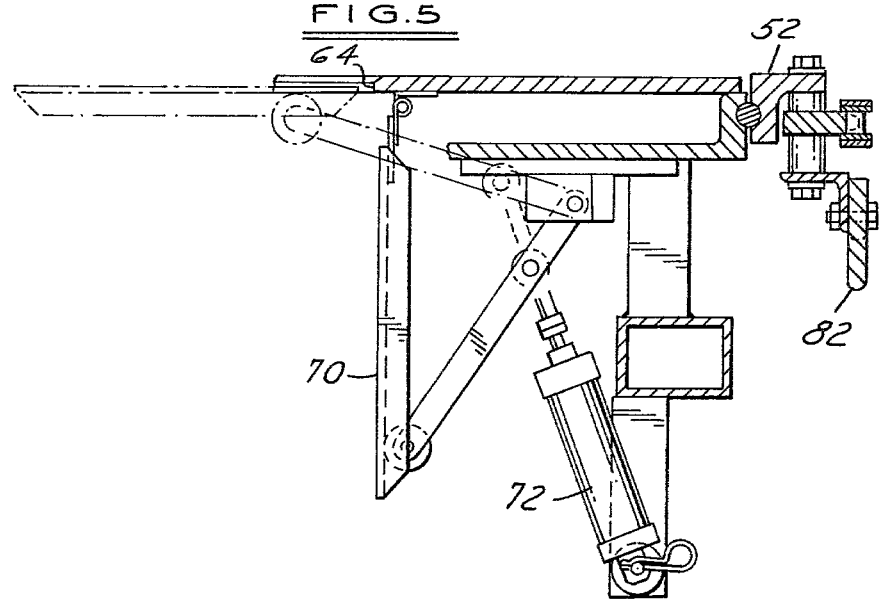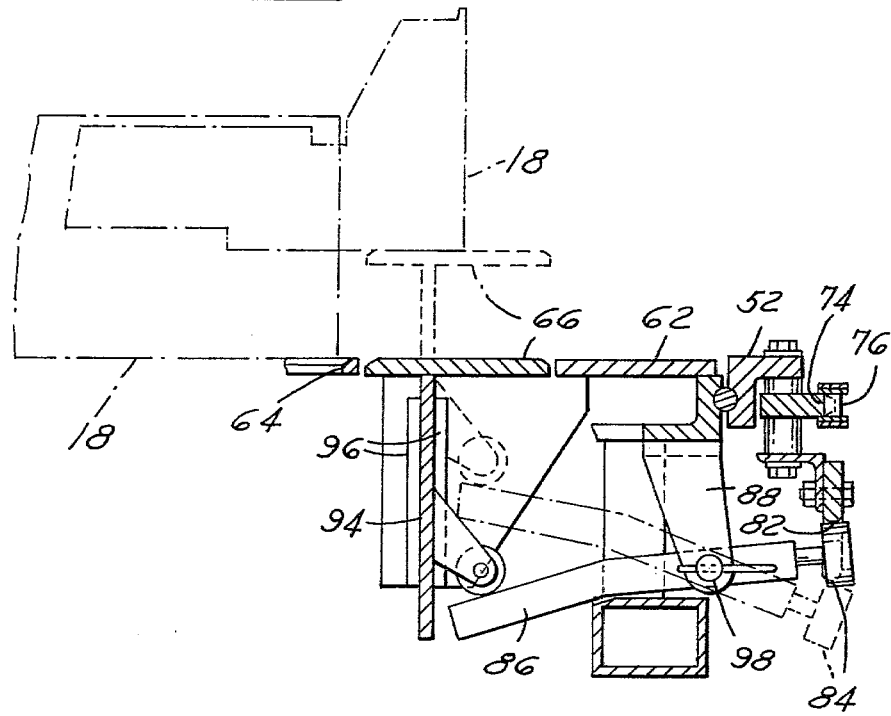

UNSTACKING MACHINE

TECHNICAL FIELD

This invention relates generally to unstacking apparatus and, more particularly, to a machine which receives a stack of cross-nested baskets, trays, or pans on a dolly and automatically first separates the stack from the dolly and then separates the baskets or the like one by one in an oriented attitude at a predetermined rate.

BACKGROUND ART

Heretofore, in order to facilitate handling baskets and the like used in the baking industry so as to meet the high production rates required, various arrangements, such as that shown and described in U.S. Pat. No. 3,869,048, have been suggested for automatically and continuously separating such containers from a nested stack one after the other and discharging same in an oriented manner.

DISCLOSURE OF THE INVENTION

A general object of this invention is to provide a compact, economical and efficient mechanism for accomplishing the above.

Another object of the invention is to provide an improved unstacking apparatus for unstacking cross-nested backets in an oriented attitude, including first conveyor means for conveying a stack of baskets on a dolly, first support means for supporting the stack, pusher means slidably mounted adjacent the first support means, turn table means located adjacent the first support means having a fixed rectangular opening formed therein, second support means pivotally mounted in the opening of the turn table means for supporting the stack while being pushed by said pusher means toward said turn table means, actuator means for rotating the turn table and the stack in either a clockwise or counterclockwise direction as required to orient the cross-nested baskets relative to the rectangular opening, cam means on the turn table for raising oppositely disposed plate members to support the second from the bottom basket while permitting the bottom basket to drop through the opening, and second conveyor means for receiving and discharging the dropped oriented baskets.

These and other objects and advantages of the invention will become more apparent when reference is made to the following drawings.

BRIEF DESCRIPTION OF DRAWINGS

FIGS. 5 and 6 are cross-sectional views taken along the plane of the lines 5—5 and 6—6, respectively, of FIG. 4 and looking in the directions of the arrows;

BEST MODE OF CARRYING OUT THE INVENTION

Figure 1:
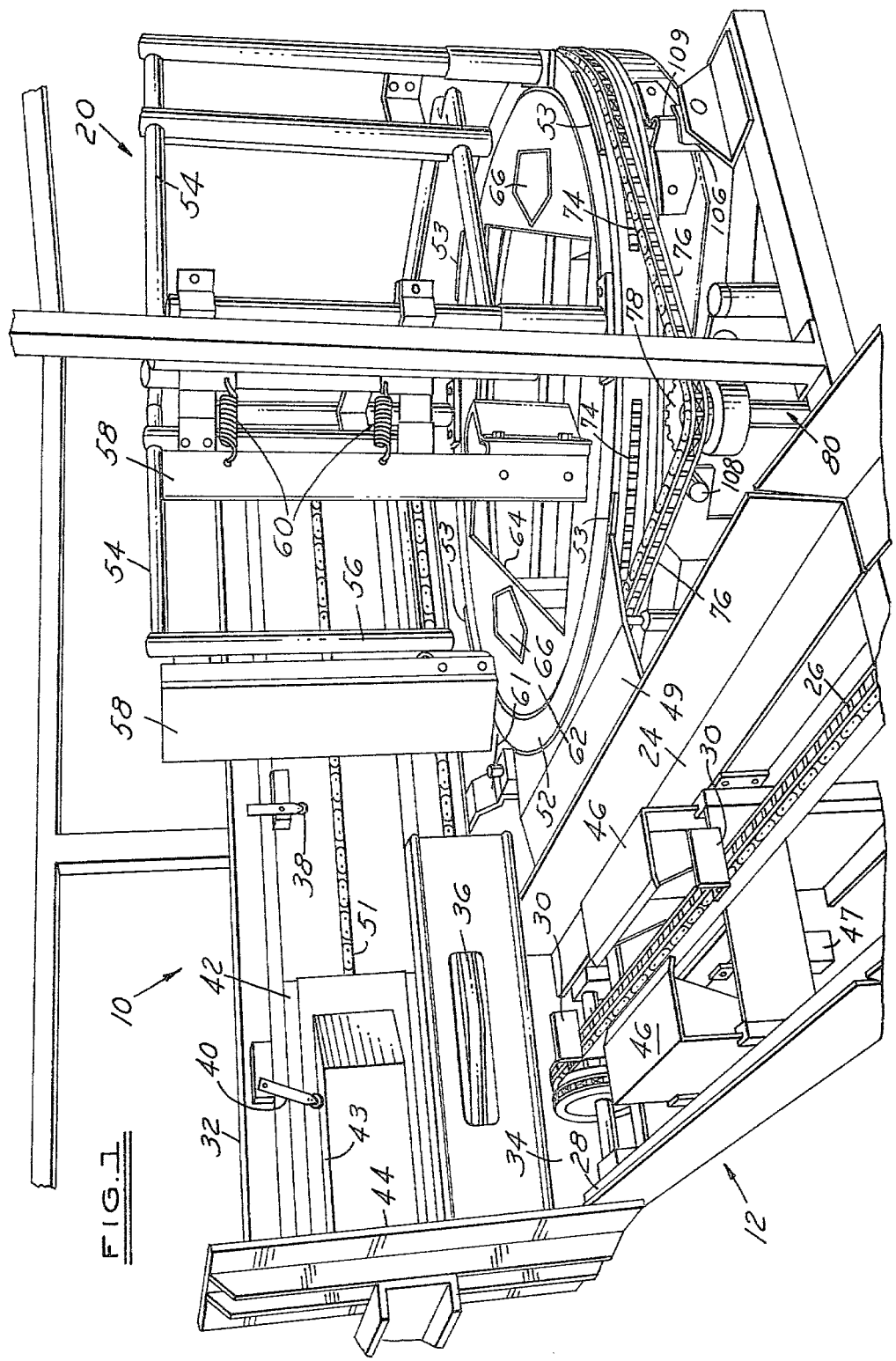
FIG. 1 is a fragmentary front perspective view of an unstacking apparatus embodying the invention.
Figure 2:
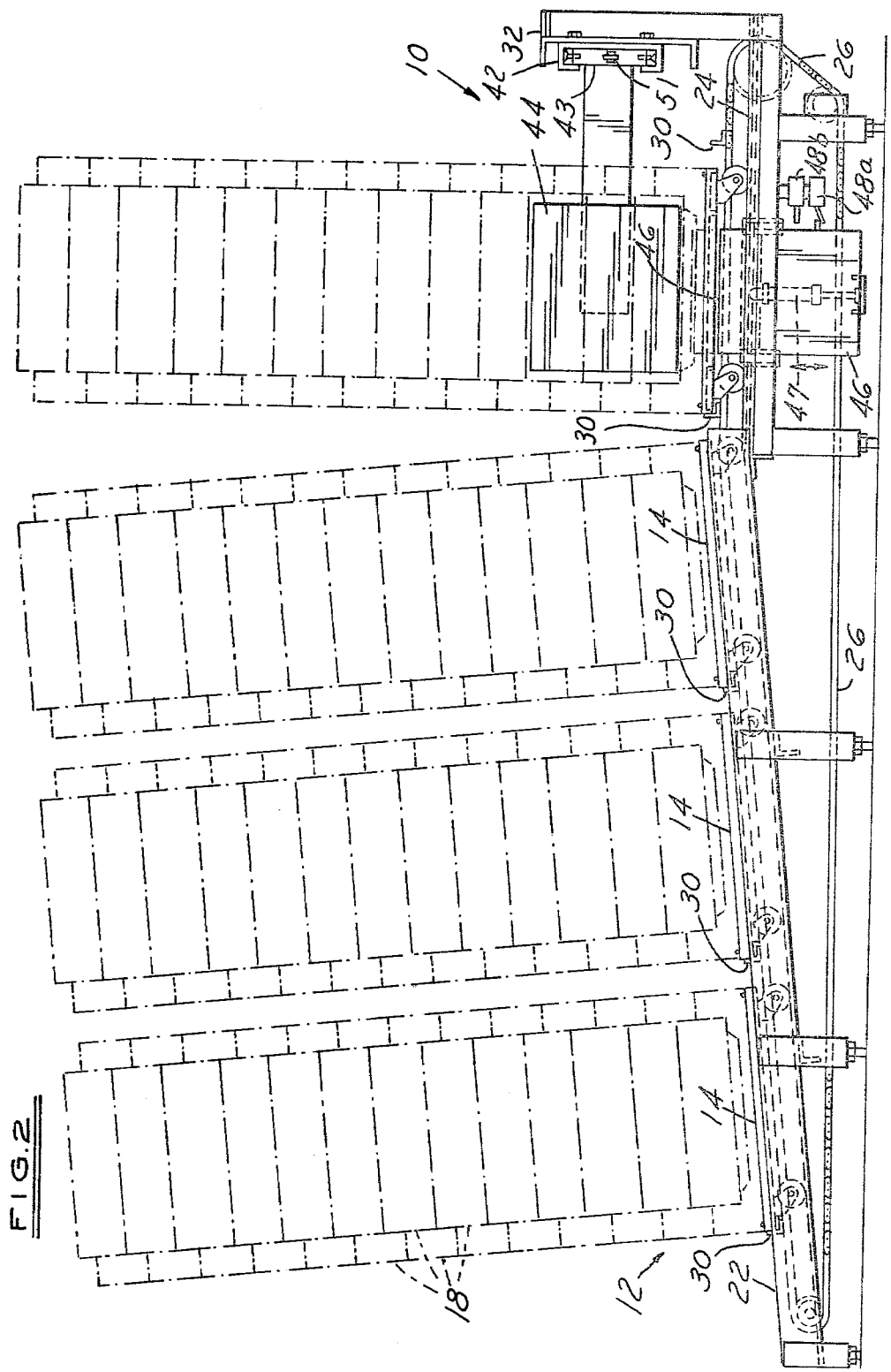
FIG. 2 is a side elevational view of the inlet portion of the unstacking apparatus.
Figure 3:
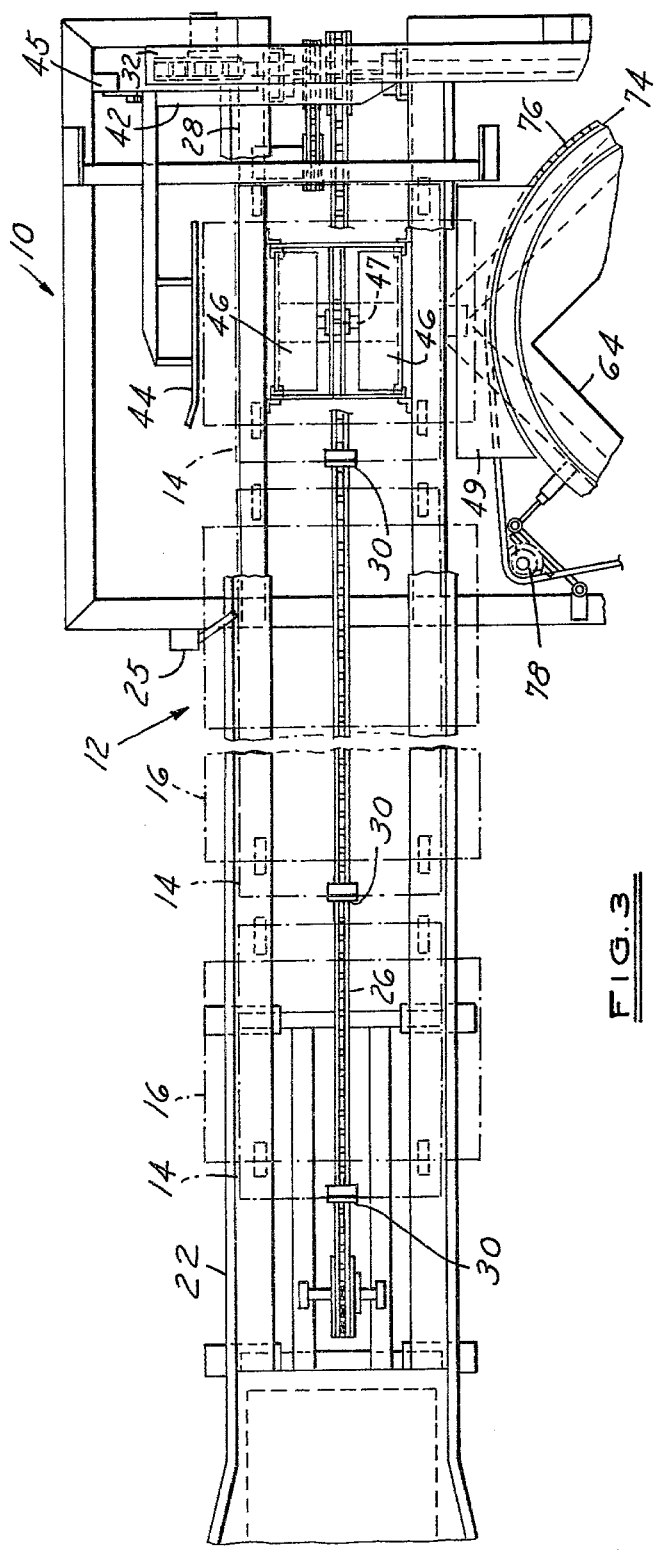
FIG. 3 is a fragmentary top view of the inlet portion of the unstacking apparatus.

Referring now to the drawings in greater detail, FIGS. 1-3 illustrate an unstacking machine 10 including generally an inlet conveyor section 12 for transporting a succession of dollies 14, each bearing a stack 16 of baskets or trays 18, or the like, and an unstacking turn table section 20 for receiving the stacks 16 from the inlet conveyor section away from its respective dolly 14, orienting each successive bottom basket by rotating the stack as required, and then repeated discharging the bottom baskets at a predetermined rate.

More specifically, the inlet conveyor section 12 includes an inclined inlet ramp 22 and a flat platform 24 adjacent the upper end of the ramp. Suitable switch means, such as a flag type limit switch 25, is mounted at approximately the juncture between the ramp 22 and the platform 24. An endless conveyor chain 26 is mounted along the centerline of the ramp and platform, adapted to be indexed therealong by suitable hydraulic actuator means 28 (FIG. 3). Spaced pusher brackets 30 are secured to the chain 26 for movement therewith. The brackets 30 are spring-loaded so as to stand upright, but may be pivotted forward, i.e., to the right in FIG. 2, to accommodate manually moving a dolly 14 and stack 16 up the ramp and just past a respective bracket 30. An endwall 32 is formed along the end of the platform 24, perpendicular to the path of the chain 26, with a rectangular opening 34 (FIG. 1) formed in the wall 32 above the chain. A chain 36 is mounted on the wall 32 just above the opening 34. Spaced, aligned additional switches 38 and 40 are also mounted on the wall 32, adjacent the upper edge thereof, and adapted to at times be actuated respectively by a slide member 42 slidably mounted along the midportion of the wall 32 and a ledge 43 formed on the member 42. A vertical pusher plate 44 is secured to left end (FIG. 1) of the slide member 42, extending along a side of the platform 24 (FIG. 3) for a distance equal to the length of a basket 18. Still another switch 45 (FIG. 3) is fixedly positioned adjacent the end of the slide member 42 which supports the pusher plate 44.

A lift table 46 is mounted in the center of the platform 24 and consists of two halves spaced so as to straddle the chain 26. The lift table 46 is adapted to at times be raised by suitable cylinder means 47 (FIG. 2), between limits set by switches 48a and 48b. The cylinder means is actuated actuated by the switch 36.

A substantially horizontal plane 49 is secured to a side of the platform 24 opposite the pusher plate 44, forming a shelf between the inlet conveyor section 12 and the unstacking section 20. As may be best noted in FIG. 9, the end wall 32 extends across both the end of the inlet conveyor section 12 and the side of the unstacking section 20. A hydraulic motor 50 serves to drive a chain 51 which extends along the inner surface of the wall 32 and is adapted to move the slide member 42 and, hence, the pusher plate 44 upon energization of the motor 50 by actuation of the switch 36.

The unstacking section 20 includes a cylindrical turn table 52 (FIG. 1), whose top surface is on the plane of the top surface of the shelf 49. Four equally spaced strips 53, serving as switch actuators, are secured to the outer upper edge portion of the cylindrical table 52. A three sided frame 54 (FIGS. 3 and 4) is secured to the upper face of the turn table 52 for rotation therewith. Initially, the open fourth side serves as an inlet 56 (FIG. 4) for the stack 16, and is illustrated in its "home" position, i.e., in position to receive a stack of baskets from the conveyor section 12. A pair of pivotable doors 58, mounted adjacent the ends of the frame 54 on opposite sides of the inlet 56. A pair of springs 60 (FIG. 1) are connected between each door 58 and the adjacent end of the frame 54. A switch 61 is mounted on the wall 32 in the path of the switch actuators 53.

A fixed table 62 (FIG. 1) is mounted within the turn table 52. A rectangular opening 64 is formed in the fixed table 62 and has its longitudinal axis positioned at approximately a 45° angle with respect to the line of travel of a stack from the platform 26 across the shelf 49, as may be noted in FIG. 4.

A pair of oppositely disposed, five-sided lift plates 66 are mounted in compatable openings 68 formed in the fixed table 62 for a purpose to be described. A pair of support plates 70 are pivotally mounted within the rectangular opening 64, the top surfaces of which are flush with the plane of the fixed and turn tables 62 and 52, respectively, when the plates are raised, for a purpose to be described. As illustrated in FIG. 5, each support plate 70 is pivotally mounted beneath the fixed table 62 and, at predetermined times, may be actuated from a vertical to a horizontal attitude and back again by a suitable cylinder means 72. While two such support plates 70 are provided, only the one aligned with the inlet arrow A is functionable at any time. The particular selection depends upon whether the longitudinal axis of the rectangular opening 64 is initially selected to assume the position shown in FIG. 4, i.e, aligned with the discharge arrow B, or whether the lateral axis is initially selected to assume that position. More particularly, such selection depends upon whether it is desired to have the baskets 18 oriented after unstacking with their lengths aligned or with their widths aligned.

By referring once again to FIG. 1, it may be noted that teeth 74 are formed around the outer periphery of the turn table 52, below the top surface thereof, for meshing with a chain 76 which, in turn, meshes with a drive sprocket 78. The latter is driven by suitable power means, such as hydraulic motor means, represented at 80.

Figure 8:
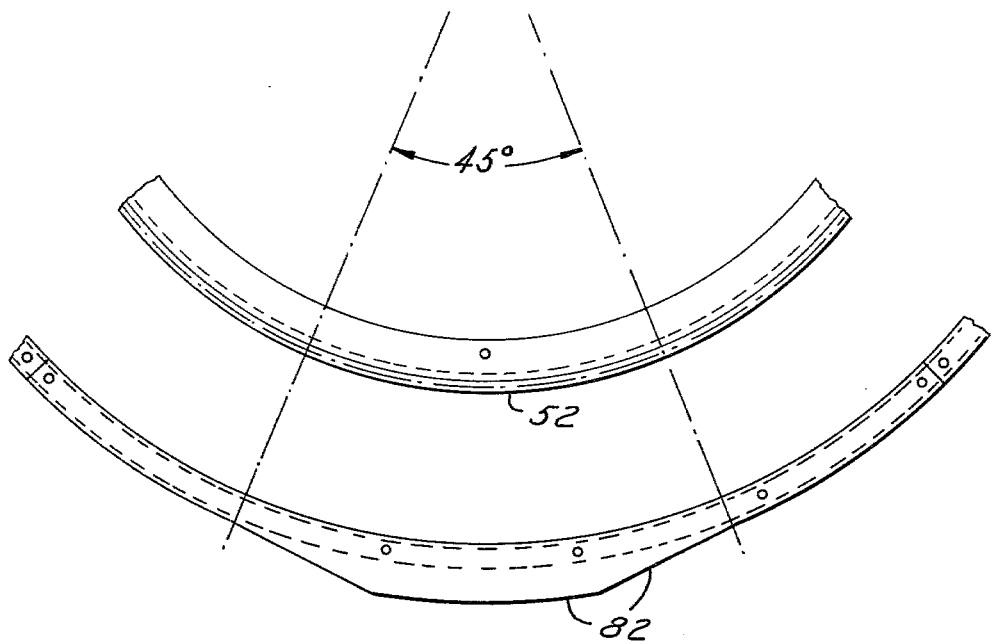
FIG. 8 is a fragmentary top view of the turn table portion of the structure, with the side thereof projected in a manner so as to illustrate the cam configuration formed on the bottom surface thereof.
Figure 7:
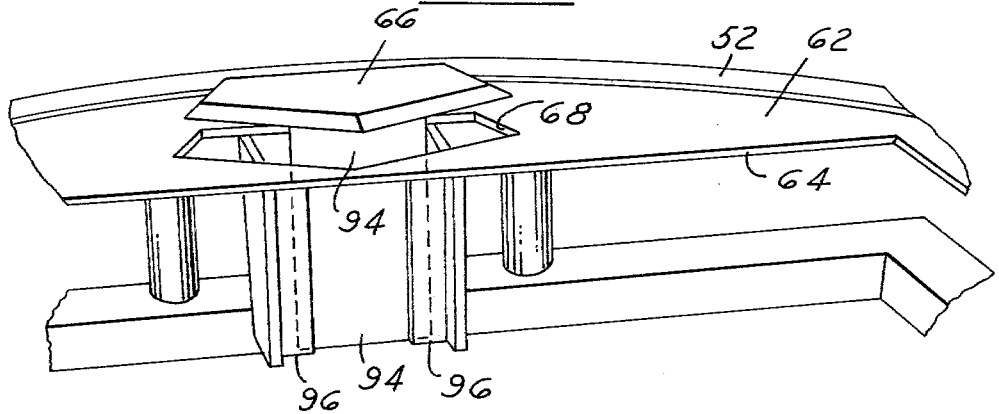
FIG. 7 is a fragmentary perspective view of a portion of the FIG. 6 structure illustrating one operative position thereof.

Oppositely disposed cam surfaces 82 (FIGS. 8 and 9) are formed on the bottom of the turn table 52, adjacent the outer periphery thereof. As illustrated in FIG. 6, a cam follower 84 is formed on the outer end of a lever arm 86 which is pivotally mounted at an intermediate point therealong on a bracket 88 extending from the under side of the fixed table 62. The inner end of the lever arm 86 abuts against a roller 90 rotatably mounted on a bracket 92 secured to a vertical plate 94. The latter is freely slidably mounted between spaced wall members 96. The lift plates 66 are secured to the upper extended end of the vertical plate 94. By virtue of the weight of the components inward of the pivot point 98, the cam follower 84 is held in engagement with the respective cam surface 82 for movement between the extremes indicated by the solid and phantom lines shown in FIG. 6, thereby raising and lowering the lift plates 66, as will be explained.

Figure 9:
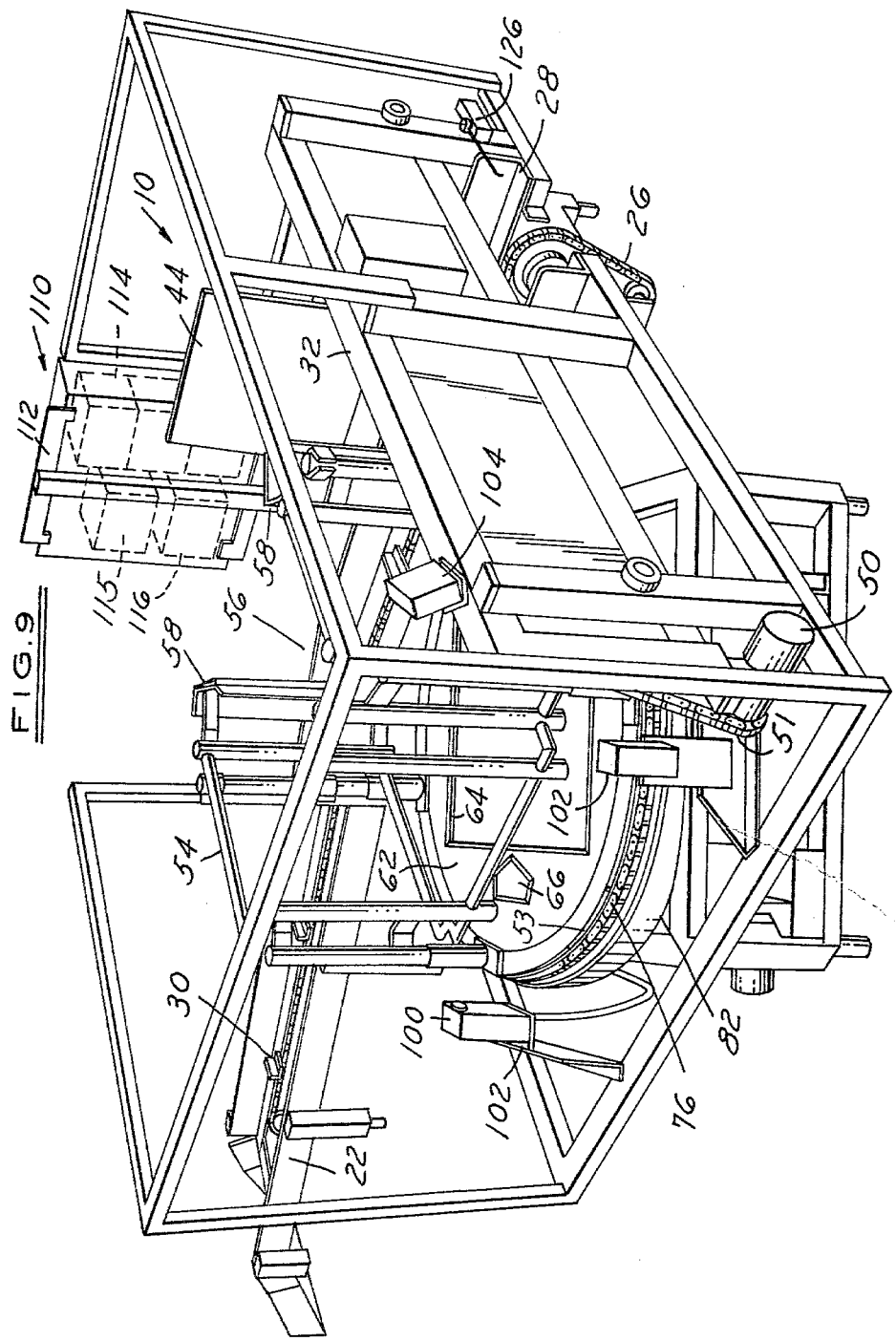
FIG. 9 is a rear perspective view of the unstacking apparatus embodying the invention.

As shown in FIG. 9, photoelectric units 100, 102 and 104 are mounted around the turn table 52 for purposes to be described. Additionally, as shown in FIG. 1, magnetic proximity switches 106 and 108 are mounted at predetermined points around the outer peripheral surface of the turn table 52 for actuation by a bracket 109 mounted on the latter.

A control panel 110 (FIG. 9), mounted on supporting framework 112, houses suitable conventional control relays, time delay units, and solenoid valves, represented at 114a, b, c, d, e, f and g, 115a, b, c and d, and 116, respectively, are operatively connected as required for cooperation with the various switches and photoelectric units in the following operation.

Figure 10:
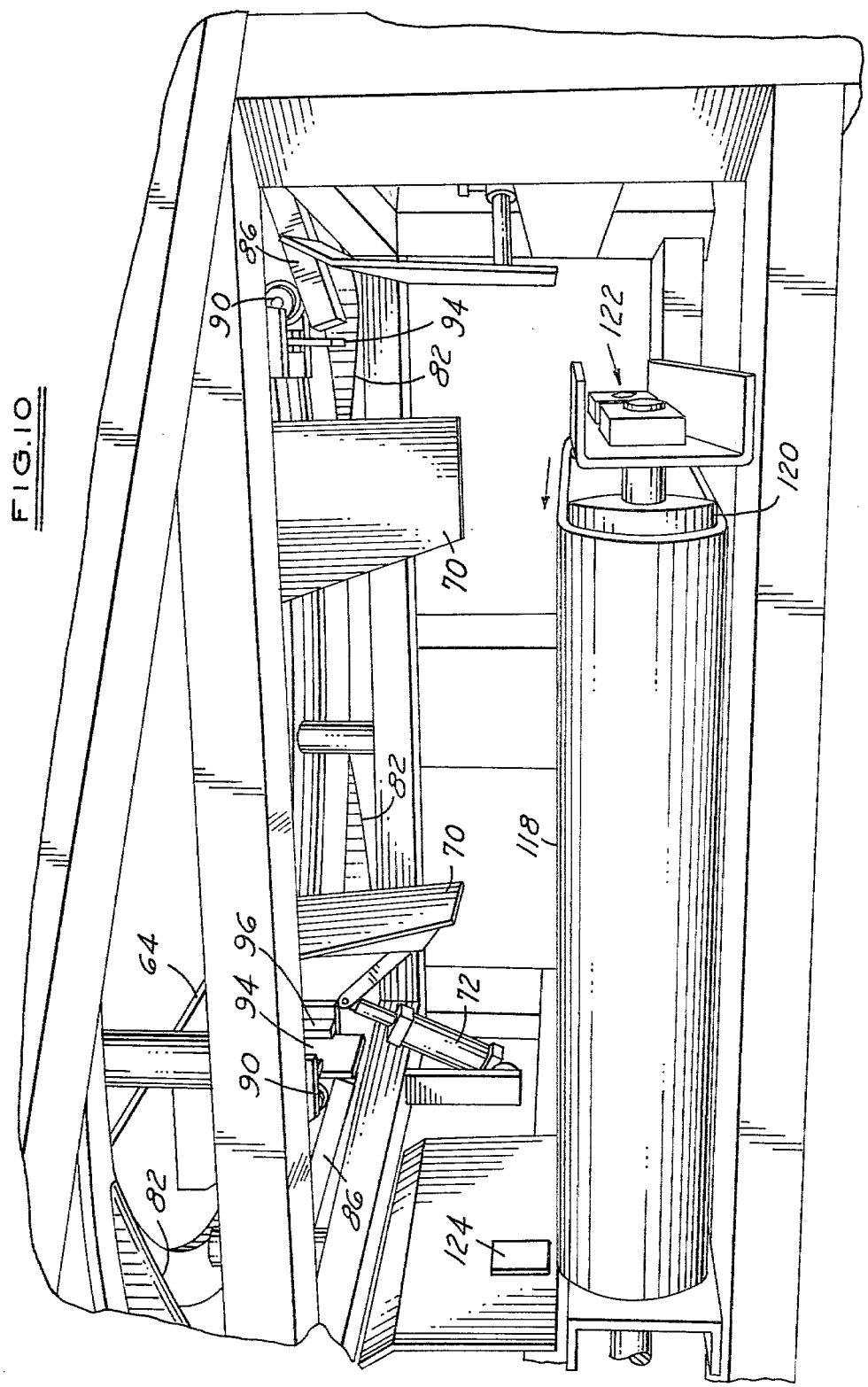
FIG. 10 is a fragmentary end view of the discharge portion of the unstacking apparatus.
Figure 11:
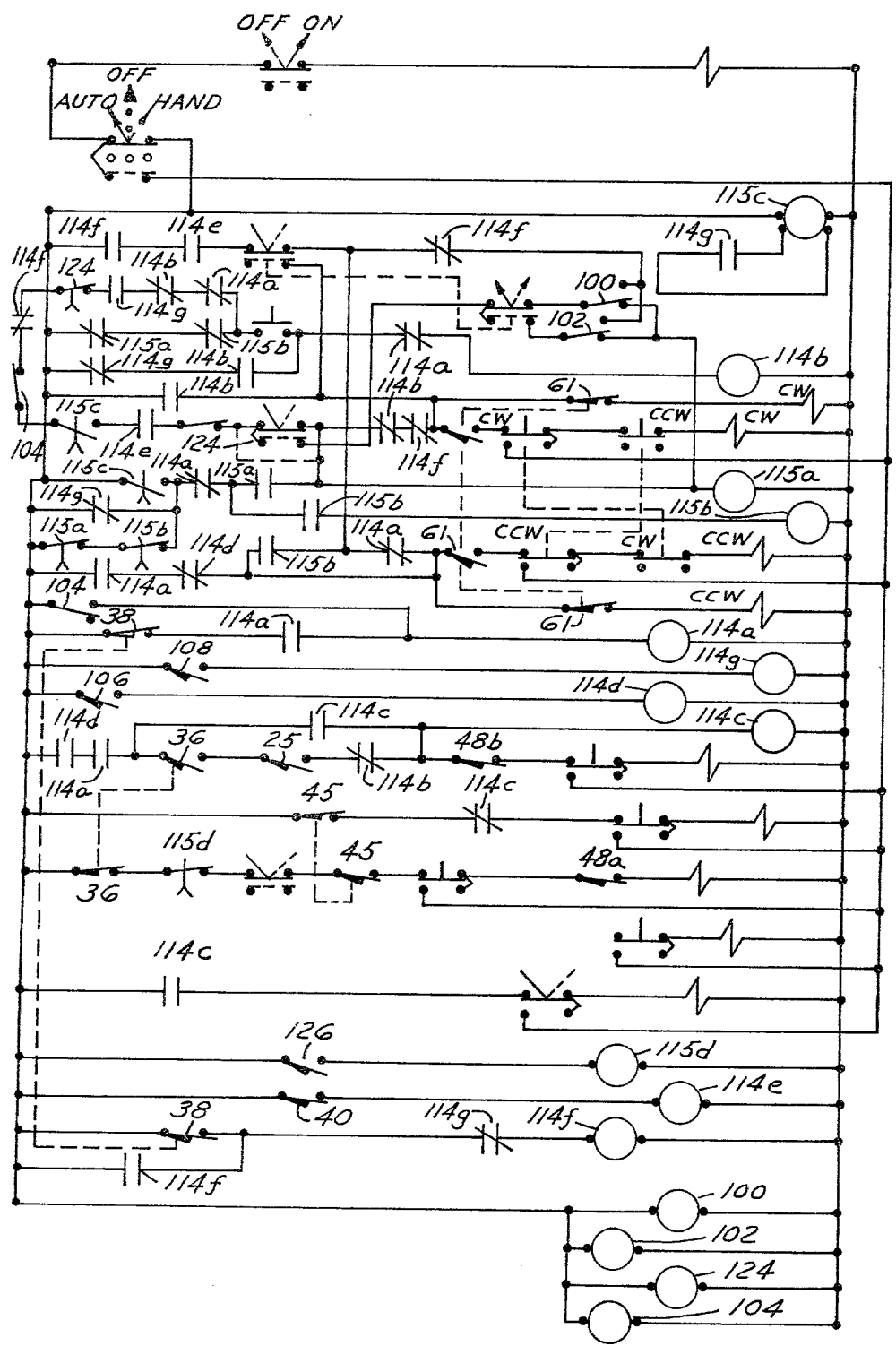
FIG. 11 is a wiring diagram suitable for the invention.

As illustrated in FIG. 10, an endless conveyor belt 118 is mounted around rollers 120 directly beneath the rectangular opening 64, and is continuously driven by suitable motor means 122. An additional photoelectric unit 124 may be mounted along side the conveyor belt 118 to detect any backup of baskets along the latter. A limit switch 126 (FIG. 9) is mounted on the outer surface of the wall 32, adjacent the dolly discharge opening 34, to detect any backup of dollies outside the opening.

OPERATION

As shown in FIGS. 2 and 3, the dollies 14, each bearing a stack 16 of baskets 18, are loaded onto the conveyor chain 26 by having been manually pushed past the respective pivotable pusher brackets 30 at the inlet of the ramp 22. The chain 26 will run to move the baskets 18 toward and onto the first operational station, namely, the platform 24. Thereafter indexing will occur in cooperation with the unstacking cycle taking place in the turn table section 20, as will be explained. Indexing will continue as each last basket is discharged from the turn table section 20 so long as a dolly and stack is on the platform 24 in contact with the switch 36 (FIG. 1), and a second dolly and stack is in contact with the switch 25 (FIG. 3).

More specifically, once a basket 18 of the first of two stacks 16 contacts the switch 36, the chain 26 stops and the cylinder means 47 is actuated, causing the spaced halves of the lift table 46 to raise on opposite sides of the chain 26 through appropriate spaces in the floor of the dolly 14, into contact with the bottom basket 18, thereby lifting the entire stack 16 off the dolly until the switch 48b is contacted. Now, so long as no basket remains within the frame 54 to break the beam of the photoelectric unit 104 (FIG. 9), and provided the turn table 52 is in its home position, i.e., the position shown in FIGS. 4 and 1, the hydraulic motor 50 is actuated to drive the chain 51. The chain 51 is adapte to move the slide member 42 and, hence, the associated pusher plate 44 into contact with the adjacent side of the stack 16, whereupon the stack 16 is urged laterally off the lift table 46 onto the shelf 49 and thence past the pivotable doors 58 (FIG. 4) through the inlet opening 56, onto and across the rectangular opening 64 within the turn table 52.

Actuation of the magnetic switch 106 by the bracket 109, besides indicating the home position of the turn table 52, also causes the support plate 70 adjacent the leading corner of the rectangular opening 64 to pivot upwardly within the opening to help support the stack 16 as its slides across the opening. Once the stack 16 reaches the far side of the three-sided frame 54, the doors 58 are urged back into their free-standing positions by the springs 60 (FIG. 1) to retain the stack in position within the frame 54. Also, the leading edge of the slide member 42 now contacts the switch 38 which, through appropriate control relays 114, causes the hydraulic motor 50 to begin to retract the slide member 42 and its associated pusher plate 44, and also causes the turn table 52 to rotate 45° from the switch 106 home position to the switch 108 operative position for beginning the unstacking cycle, i.e., bringing the baskets 18 into a starting position wherein the bottom basket's front or back wall is in line with the photoelectric unit 100 (FIG. 9). If it were desirable to have the baskets discharge with their widths aligned, rather than with their lengths aligned, the fixed rectangular opening 64 would be positioned such that its longitudinal axis is at a 90° angle with respect to the path indicated by the arrow B in FIG. 4, and the photoelectric unit 102 would be operative instead of the unit 100.

Now, inasmuch as the baskets 18 may be designed such that each has a lower front wall and a higher back wall, they may very well be stacked such that the front and back walls may be positioned in opposite directions at random. Accordingly, the photoelectric unit 100 is located at an elevation such that its beam will be intercepted by the high wall only. Depending on the time differential signal between contacting a high wall which is closest to the unit 100 and a high wall which is on the side farther away from the unit 100, the unit 100 causes the turn table 52 to rotate 90° either clockwise or counterclockwise, causing the four walls to be oriented just above the rectangular opening 64. Actuation of the switch 61 by any one of the switch actuators 53 causes the turn table 52 to rotate at a slower speed just prior to the conclusion of the 90° movement.

Figure 4:
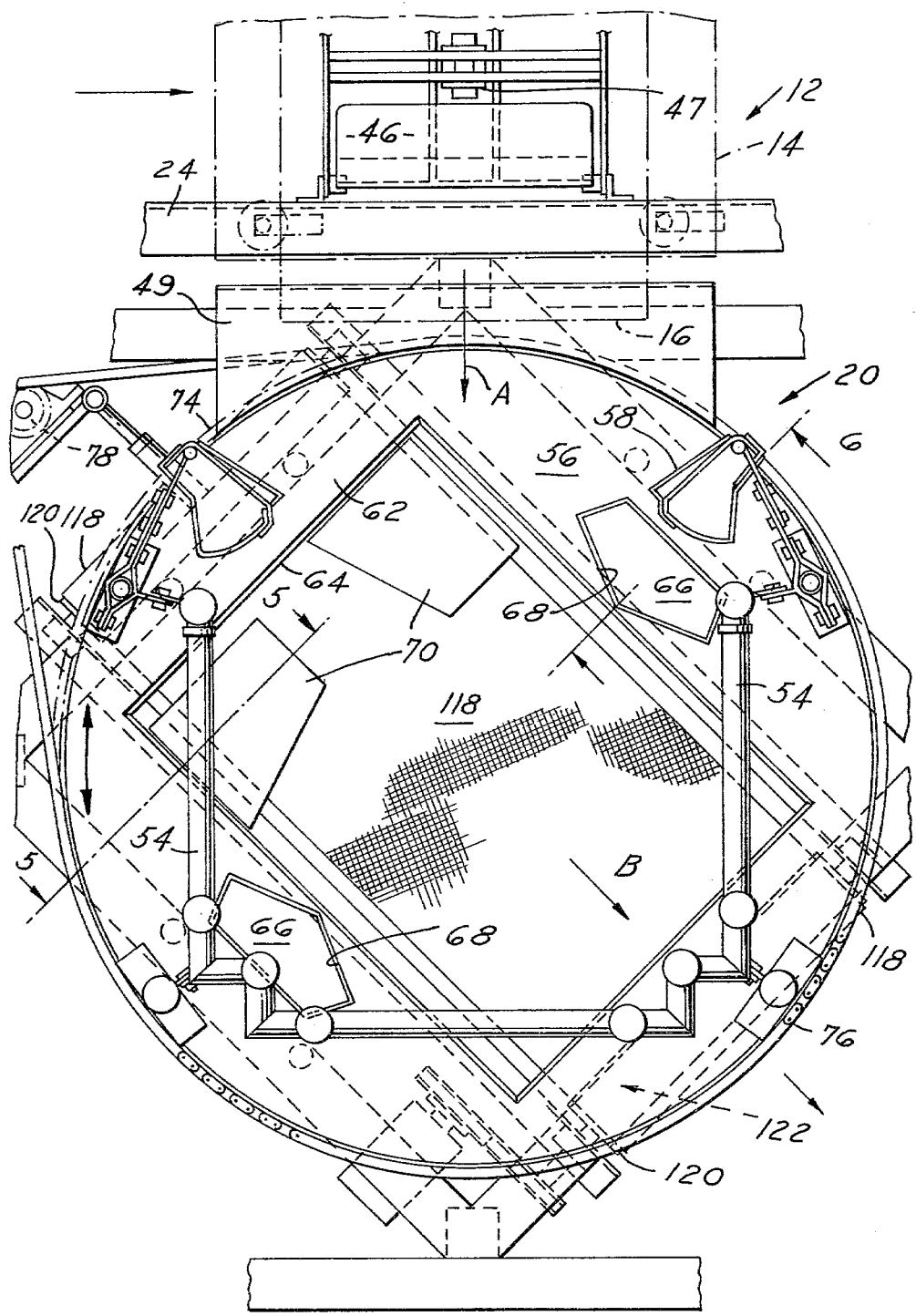
FIG. 4 is a fragmentary top view of the unstacking portion of the apparatus.

More specifically, if the high back wall, for example, is closest to the unit 100, the turn table 52 would be caused to rotate clockwise 90° and the bottom basket would drop through the rectangular opening 64 onto the conveyor belt 118 (FIG. 10) with the low wall leading (FIG. 4). During the 90° rotation, the remaining baskets in the stack would be supported by the lift plates 66, the latter having been raised into contact with the second from the bottom basket by virtue of the camming action between the cam follower 84 and the cam surface 82. Once the 90° rotation has been completed, it's apparent that the next cross-nested basket would now be in position to be observed by the photo-electric unit 100. Then, if the low front wall, for example, is closest to the unit 100, the turn table 52 would be caused to rotate counterclockwise 90° so that the new bottom basket would drop through the opening 64 with the low wall leading, for travel along the conveyor 118 in an oriented attitude behind the previous basket. This cycling would continue until all the baskets in the stack have been dropped through the opening 64 and have discharged for further processing, such as being filled with bread or rolls for example. As indicated above, the photoelectric unit 104 will then signal the absence of baskets within the frame 104, and the turn table 52 will return to its home position, i.e., into a position wherein the basket 109 contacts the switch 106.

Retraction of the slide member 42 is stopped upon contact with the limit switch 45 (FIG. 3). Actuation of the switch 45 also causes the lift table 46 to lower and the chain 26 to begin moving once again, thereby discharging the empty dolly 14 through the opening 34 in the wall 32 and moving the next dolly and its stack onto the platform 24 and into contact with the switch 36 to begin the next cycle.

INDUSTRIAL APPLICABILITY

It's apparent that the invention provides a compact and efficient unstacking arrangement particularly adaptable for use in the baking industry.

While but one embodiment of the invention has been shown and described, other modifications thereof are possible.

What is claimed is:

1. An unstacking apparatus for receiving a stack of cross-nested baskets on a dolly and automatically separating the stack from the dolly and then separating the baskets one at a time from the bottom of the stack and discharging each bottom basket in an oriented attitude, said apparatus comprising
    (a) inlet conveyor means for receiving said dolly and its stack of cross-nested baskets and moving same to a first station;
    (b) means at said first station adapted to being actuated upon being contacted by said stack of baskets for stopping said conveyor means and lifting the stack off the dolly;
    (c) pusher means for pushing the stack off the lift table and into a second station;
    (d) means at said second station for automatically repeatedly observing the initial attitude of each succeeding bottom basket of the stack and rotating the stack either clockwise or counterclockwise as required to position each bottom basket in a constant oriented attitude;
    (e) means for supporting the stack except for the oriented bottom basket thereof and allowing the bottom basket to drop away from the stack; and
    (f) discharge conveyor means for receiving each successive oriented basket and discharging the baskets in an aligned oriented condition.

2. An unstacking apparatus for handling a series of stacks of cross-nested baskets on dollies and automatically separating each stack from its respective dolly and then orienting and separating the baskets of each stack in turn one at a time from the bottom thereof and discharging each oriented bottom basket, said apparatus comprising
    (a) an inlet conveyor for conveying the dollies, each carrying a stack of cross-nested baskets and moving same to a platform;
    (b) a lift table mounted for vertical reciprocal movement on said platform;
    (c) means on said platform adapted to being actuated upon being contacted by said stack of baskets for stopping said inlet conveyor and causing said lift table to lift the stack off the dolly;
    (d) a turn table located adjacent said platform;
    (e) pusher means responsive to the elevation of said lift table for pushing the stack off the lift table and into position on said turn table;
    (f) means adjacent said turn table for automatically repeatedly observing the initial attitude of each succeeding bottom basket of the stack and rotating said turn table either clockwise or counterclockwise as required to position each bottom basket in a constant oriented attitude;
    (g) support means adapted to support the stack except for the oriented bottom basket thereof and thereby allowing the bottom basket to drop away from the stack;

(h) cam means formed on said turn table for elevating said support means in response to the rotation of said turn table; and (i) discharge conveyor means for receiving each successive oriented basket and discharging the basket in an aligned oriented condition.

3. An unstacking apparatus for handling a plurality of stacks of cross-nested baskets on dollies and automatically separating each stack from its respective dolly and then orienting and separating the baskets of each stack in turn one at a time from the bottom thereof and discharging each oriented bottom basket, said apparatus comprising (a) an inlet conveyor and spaced drive attachments for conveying said plurality of dollies and their respective stacks of cross-nested baskets;

(b) a lift table straddling said conveyor and mounted adjacent the end of said inlet conveyor;

(c) a pusher plate located at one side of said lift table;

(d) first switch means above said end of said inlet conveyor adapted to being actuated upon being contacted by said stack of baskets for stopping said inlet conveyor and lifting the stack off its dolly;

(e) a turn table located adjacent to the other side of said lift table oppositely disposed from said pusher plate and having a home position relative thereto;

(f) a fixed rectangular opening located within said turn table;

(g) second switch means responsive to the raising of said lift table for causing said pusher plate to push the stack off the lift table and into position on said turn table over said rectangular opening at a 45° angle relative thereto;

(h) third switch means for turning said turn table 45° so as to be positioned at a 90° angle relative to said rectangular opening;

(i) first photoelectric means adjacent said turn table for signalling the initial attitude of the bottom basket of the stack in said 90° angular position;

(j) drive means for rotating said turn table and the stack 90° in either clockwise or counterclockwise direction in response to the signal from said first photoelectric means in order to orient each basket for dropping through said rectangular opening;

(k) support means vertically slidably mounted on oppositely disposed sides of said rectangular opening for supporting the stack except for the oriented bottom basket thereof and allowing the bottom basket to drop away from the stack;

(l) cam means formed on said turn table for raising and lowering said support means in response to rotation of said turn table;

(m) a discharge conveyor mounted below said rectangular opening for catching each successive oriented basket and discharging the baskets in an aligned oriented condition; and (n) second photoelectric means adjacent said turn table for signalling the absence of baskets in said turn table and causing said drive means to return said turn table to its home position.

4. A method of unstacking cross-nested baskets having their front and rear walls positioned at random on dollies, said method comprising the following steps:

(a) loading dollies bearing respective stacks of cross-nested baskets onto a first conveyor;

(b) conveying the dollies and stacks toward a first station;

(c) stopping the conveyor as each dolly and stack reaches the first station;

(d) lifting the stopped stack off its respective dolly;

(e) pushing the stack laterally off the dolly onto a rotatable turn table that is in a home position, for rotation with the turn table;

(f) rotating the turn table and stack to a start position;

(g) observing the attitude of the front and/or rear walls of each bottom basket in turn and rotating the turn table 90° clockwise or counterclockwise as required to orient each bottom basket in turn with respect to its front wall;

(h) supporting each second from the bottom cross-nested basket during its respecitve 90° rotation and thereby permitting each oriented bottom basket to fall free once the 90° rotation is completed; and (i) receiving and conveying the dropped oriented baskets in a line to a discharge point.

* * * * *